United States Patent
Börner

(12)
(10) Patent No.: US 6,196,378 B1
(45) Date of Patent: Mar. 6, 2001

(54) CONVEYOR BELT CONNECTOR AND METHOD

(75) Inventor: Gerhard Börner, Wiesbaden (DE)

(73) Assignee: MATO Maschinen-und Metallwarenfabrik Curt Matthaei GmbH & Co. KG (DE)

(*) Notice: Subject to any disclaimer, the term of this patent is extended or adjusted under 35 U.S.C. 154(b) by 0 days.

(21) Appl. No.: 09/352,228

(22) Filed: Jul. 13, 1999

(30) Foreign Application Priority Data

Jul. 16, 1998 (EP) .................................. 98113255

(51) Int. Cl.[7] .................................. B65G 15/30
(52) U.S. Cl. .................................. 198/844.2; 24/33 P
(58) Field of Search .................. 198/844.2; 24/33 B, 24/33 P, 33 R, 33 C, 31 H

(56) References Cited

U.S. PATENT DOCUMENTS

| 5,341,545 | 8/1994 | Herold | 24/33 P |
| 6,085,897 | * 7/2000 | Schick | 198/844.2 |

FOREIGN PATENT DOCUMENTS

| 608511 | 1/1935 | (DE) . |
| 648358 | 7/1937 | (DE) . |
| 4235759A1 | 5/1994 | (DE) . |
| 1278024 | * 12/1961 | (FR) ............................... 198/844.2 |
| 1102993 | 2/1968 | (GB) . |
| 1165254 | 9/1969 | (GB) . |

* cited by examiner

*Primary Examiner*—James R. Bidwell
(74) *Attorney, Agent, or Firm*—Price, Heneveld, Cooper, DeWitt & Litton

(57) ABSTRACT

A conveyor belt connector and method includes a plurality of connecting elements mounted on opposite ends of an associated conveyor belt or the like. A plurality of connector fastening elements are received through the connecting elements and the conveyor belt to mount the connecting elements on the conveyor belt. At least one reinforcing strap is provided, and is closely received in a corner recess formed in one of the faces of the conveyor belt. The reinforcing strap extends longitudinally along the conveyor belt, and has one end thereof attached to the conveyor belt by at least one of the connector fastening elements. A strap fastener connects the opposite end of the reinforcing strap to the conveyor belt, whereby the reinforcing strap relieves stress at the opposite sides of the belt connector to provide greater strength and durability.

37 Claims, 5 Drawing Sheets

CONVEYOR BELT CONNECTOR AND METHOD

BACKGROUND OF THE INVENTION

This invention relates to a conveyor belt connector and method having connecting elements which are disposed in a row and which are fastened to the conveyor belt ends, wherein the connecting elements are attached to the belt ends by means of fastening elements which pass through the connecting elements and through the conveyor belt, and having a tension relieving means or reinforcement which is attached to the conveyor belt in the region of a conveyor belt end by means of one or more connecting elements, wherein the tension means extends in the direction of conveying of the conveyor belt and the tension means is attached to the conveyor belt by means of additional fastening elements at a distance from the respective connecting element which attaches the tension means to the conveyor belt end.

It is known in principle from DE 42 35 759 A1 that the belt ends of conveyor belts and/or of conveyor belt parts can be connected by means of connecting elements which can be fastened to the belt ends. The connecting elements themselves are fastened to the strap ends by means of fastening elements in the form of screws, rivets or staples, for example. When U-shaped connecting elements are used, they are disposed so that their loops are situated in a meshing position at the belt ends. A coupling rod can then be inserted through the loops to make the connection. When connecting elements in the form of bridges are used, they bridge the joint location at the belt ends and are each fastened to the two belt ends.

A conveyor belt connector of the type cited at the outset is known from GB-A-1 102 993, in which, in order to increase the loading capacity of the conveyor belt connection, tension means are used in addition which are disposed in the direction of conveying, which are effective over the entire width of the conveyor belt, and which are fabricated from wires. The wires are attached to, and in particular are press-bonded to, the connecting elements and to a receiver plate which is disposed at a distance therefrom, wherein the connecting elements and the receiver plates are attached to the conveyor belt by means of fastening elements and by means of additional fastening elements. In this design, the thickness of the conveyor belt is not reduced in the end regions thereof. The connecting elements, the tension means and the receiver plates rest on both the top and bottom faces of the conveyor belt, so that the conveyor belt connector is subjected to considerable wear on both sides when the conveyor belt is in operation. The material which is conveyed by means of the conveyor belt comes into direct contact not only with the connecting elements but also with the tension means and the receiver plates. Since the thickness of the conveyor belt connector is greater than that of the conveyor belt, hard impacts always occur when the conveyor belt connector comes into contact with the driving or deflection drums of the conveyor belt, whereby considerable forces are transmitted into the conveyor belt connector. The increased wear on the conveyor belt connectors is particularly disadvantageous in the two edge zones of the conveyor belt, in which the connecting elements are subjected to higher stresses than are the connecting elements which are disposed further inward.

An edge protection device for a flexible belt formed from folding hooks is known from DE-PS 608 511. In this device, the limbs of a hinge of U-shaped cross section overlap the ends of the row of folding hooks on the top and bottom faces of the belt, and the bridge of the hinge is let into the sides of the belt, flush with the side faces thereof. The object of this design is to prevent the folding hooks at the outer edges of the belt connectors from coming loose again and again, so that one hook after another comes out due to the unequal distribution of tensile forces over the cross section of the belt. In order to transmit the forces at the ends of the flexible belt connectors far into the belt, further hinge halves of U-shaped cross section are attached to both sides of the edge protection hinge by joints which are aligned with the bridges. A disadvantage of this edge protection system is the use of joints which are freely disposed and which are thus extremely susceptible to wear and destruction. Moreover, the tension relieving forces are not transmitted into the further hinge halves directly, i.e., in the direction of conveying of the conveyor belt, but are transmitted via the external joint, due to which both the latter and the hinge halves have to withstand shearing and bending forces.

SUMMARY OF THE INVENTION

The object of the present invention is to further fashion a conveyor belt connector of the type cited at the outset so that it has a high loading capacity with respect to tear-out and breakage, and moreover so that its susceptibility to wear is minimal.

The object is achieved for a conveyor belt connector of the type cited at the outset by disposing the tension means or reinforcement solely in the two side regions of the conveyor belt, wherein the respective tension means is constructed as a reinforcing strap, and by providing the conveyor belt with at least one covering sheet, which is removed in the region of the strap.

By disposing the tension means solely in the two edge regions of the conveyor belt, it is ensured that the stresses on the conveyor belt which occur there, and which are particularly high, can be compensated for. The high tensile forces which act within the conveyor belt are transmitted into the conveyor belt at a distance from the connecting elements, and in fact they are transmitted directly and are thus transmitted in the direction of conveying, since the non-positive connection between the connecting elements and the additional fastening elements is affected directly via the tension means, which are oriented in the direction of conveying. In particular, those situations in which the conveyor belt is deformed can thus reliably be brought under control, for example in the transition from the troughed zone of the conveyor belt to the driving or deflection drum. In this transition zone, the curved conveyor belt assumes a substantially straight form and is subjected to extremely high tensile stresses at its edges. Due to the design of the conveyor belt connector according to the invention, breakage of the connecting elements is effectively prevented. By reducing the thickness of the conveyor belt by that of a covering sheet, and by disposing the straps on both sides of the conveyor belt, about the covering sheets on both sides, it is ensured that the tension-relieving straps and their fastening elements are displaced inward. Loading impacts during the operation of the conveyor belt and wear on the components of the conveyor belt connectors are thus considerably reduced. By selecting a strap as the tension means, it is ensured that the latter is only subjected to a low extent of wear, which is no higher than the wear on the conveyor belt.

According to one particular embodiment of the invention, provision is made for the thickness of the covering sheet which is removed to correspond to at least the thickness of the strap. This means that the outer face of the strap forms at least one plane with the outer face of the conveyor belt (in the region of the conveyor belt where the covering layer is not removed). Thus it is only the fastening elements of the connecting elements and of the straps which protrude in relation to the outer face of the conveyor belt. According to one particularly advantageous embodiment, the thickness of the covering sheet which is removed in each case is greater than the thickness of the strap, so that on its side remote from the strap the additional fastening element for the attachment of the strap substantially forms a plane with the outer face of the adjoining covering sheet of the conveyor belt. If the outer face of the fastening element for the respective connecting element also lies in this plane, joint edges in the region of the conveyor belt connector are eliminated as far as possible, whereby it is ensured that the connection between the belt ends is subjected to minimum wear, both during the transport of the material being conveyed and during the relative movement of the latter in relation to the conveyor belt, and during deflections of the conveyor belt.

The strap preferably consists of a fabric, particularly a textile fabric. The conveyor belt also advantageously comprises a fabric, particularly a textile fabric. This can be of single- or multi-layer construction, and forms the tensile support of the conveyor belt. The fabric is preferably provided with a top and bottom covering sheet, which in particular consists of PVC or rubber. The respective covering sheet functions as a wear layer. Optimum running properties and service lives of the straps are achieved if they exhibit an elasticity which is similar to that of the conveyor belt reduced by the covering sheet or covering sheets. The straps are preferably disposed both on the running face and on the supporting face of the conveyor belt.

In particular, the respective strap is fashioned so that it is formed as a narrow, rectangular strip. The length of the strap in the direction of conveying of the conveyor belt is preferably two to five times, particularly three to four times greater than the width thereof. The dimensions of the recess in the conveyor belt which receives the respective strap should be calculated so that the strap fills the recess.

The additional attachment of the strap to the conveyor belt can be effected in various ways. It is preferably accomplished by means of screws, rivets, staples with or without a washer plate, or connecting elements. When connecting elements are used which comprise loops and limbs, the latter surround the conveyor belt laterally and as far as possible ensure that the strap is attached over its entire width to the conveyor belt. The respective strap can additionally be attached to the conveyor belt by means of adhesive bonding, vulcanizing or the like, in order to ensure that an all-over bond is formed between the strap and the conveyor belt of reduced thickness.

Other features of the invention are illustrated in the description the Figures and the Figures themselves, wherein it should be remarked that all the individual features and all combinations of individual features essentially form part of the invention.

BRIEF DESCRIPTION OF THE DRAWINGS

The invention is illustrated in the Figures with reference to diverse examples of embodiments, but without being restricted thereto. The Figures are as follows.

DETAILED DESCRIPTION OF PREFERRED EMBODIMENTS

Figure 1:
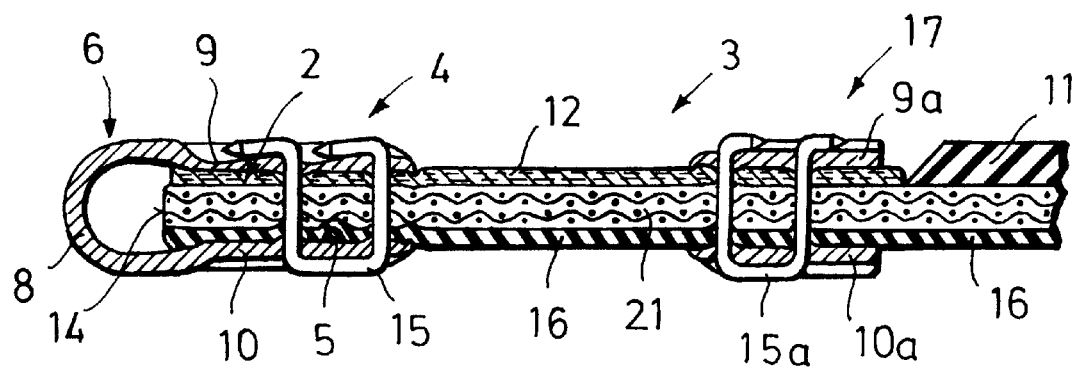
FIG. 1 is a section through a first embodiment of the conveyor belt connector according to the invention in the region of a conveyor belt end, showing the top covering sheet which is removed there and the strap which is positioned there.
Figure 2:
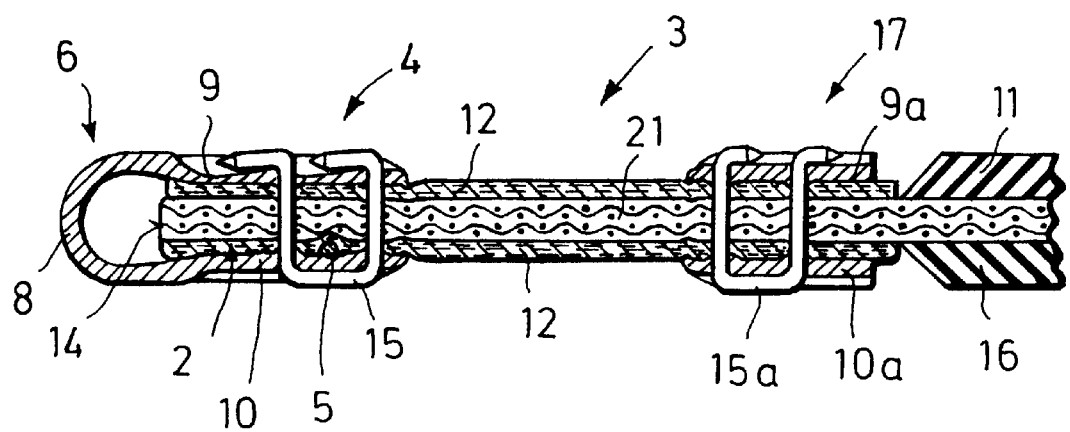
FIG. 2 is a section through an embodiment according to FIG. 1, showing the bottom covering sheet removed in addition and a further strap which is positioned there.

As can be seen from the illustrations of FIGS. 1 to 4, a conveyor belt connector strip 1 for fastening the ends 2 of a conveyor belt 3 consists of a plurality of connecting elements 4, which are joined to each other in alignment to form a unit by means of a soldered-on wire 5. In order to form a loop 6 for a coupling rod 7, each connection element 4 comprises an arcuate loop bridge 8 and limbs 9, 10. The conveyor belt 3 is of three-layer construction, which is designed so that a textile conveyor belt 21 is provided with a top covering sheet 11 and a bottom covering sheet 16, which consist of rubber for example. In the embodiment shown in FIG. 1, the top covering sheet 11 is removed, by being shaved off for example, in the edge regions 18 of the belt end 2 so that a rectangular cover recess is formed. A tension relieving means or reinforcement is placed on the respective shaved-off region of the conveyor belt 3. As can be seen from the illustration of FIG. 4, said tension means is constructed as a narrow, strip-shaped reinforcing strap 12, thickness of which is about ⅓ of the thickness of the top covering sheet 11. The strap 12 consists of a fabric, particularly a single- or multi-layer textile fabric. The strap 12, which has a rectangular surface, terminates with the end face 14 of the respective belt end 2. Together with the loop bridge 8, in the assembled state the limbs 9 and 10 of the respective connecting element 4 fit in the shape of a U around the respective belt end 2 and around the strap 12 and are fastened to the respective belt end 2 by means of fastening elements constructed as staples 15, which each pass through holes which are aligned in pairs in the respective connecting element 4, and which also pass through the conveyor belt 3 and the strap 12. As distinct from the embodiment shown in FIG. 1, in the embodiment illustrated in FIG. 2, the bottom covering sheet 16 of the conveyor belt 3 is also removed by shaving, and this region is also provided with a strap 12, which terminates with the end face 14. Both straps 12 are identical. The covering layers 11 and 16 are of the same thickness. As can be seen in particular from the illustrations of FIGS. 3 and 4, the straps 12 extend away from the coupling rod 7 in the direction of conveying 13 of the conveyor belt and in the opposite direction to the direction of conveying, and the straps 12 are additionally attached to the conveyor belt at a distance from the connecting elements 4, in the region where the covering sheet 11 or 16 is removed from the conveyor belt 3. The respective connecting element 17 is constructed in a similar manner to the connecting element 4, but does not have a loop bridge. The limbs 9a and 10a of the connecting element 17 have holes which are aligned with each other in pairs. Fastening elements in the form of staples 15a pass through the connecting elements 17, pass through the fabric 21 of the conveyor belt 3 which is freed from the covering sheets 11 and/or 16, and also pass through the strap or straps 12. Whereas the bent-around ends of the staples 15 are each oriented towards the coupling rod 7, the bent-around ends of the staples 15a are oriented away from the coupling rod 7. Each strap 12 is fastened by means of two connecting elements 4 and two connecting elements 17. The fabric 21 is a textile fabric, which has an elasticity similar to that of the fabric of the strap 12. In the embodiment shown in FIG. 2, the thickness of the conveyor belt 3 (in the region which is not reduced) is about the same as the clamping span of the fastening elements 15 and 15a.

Figure 3:
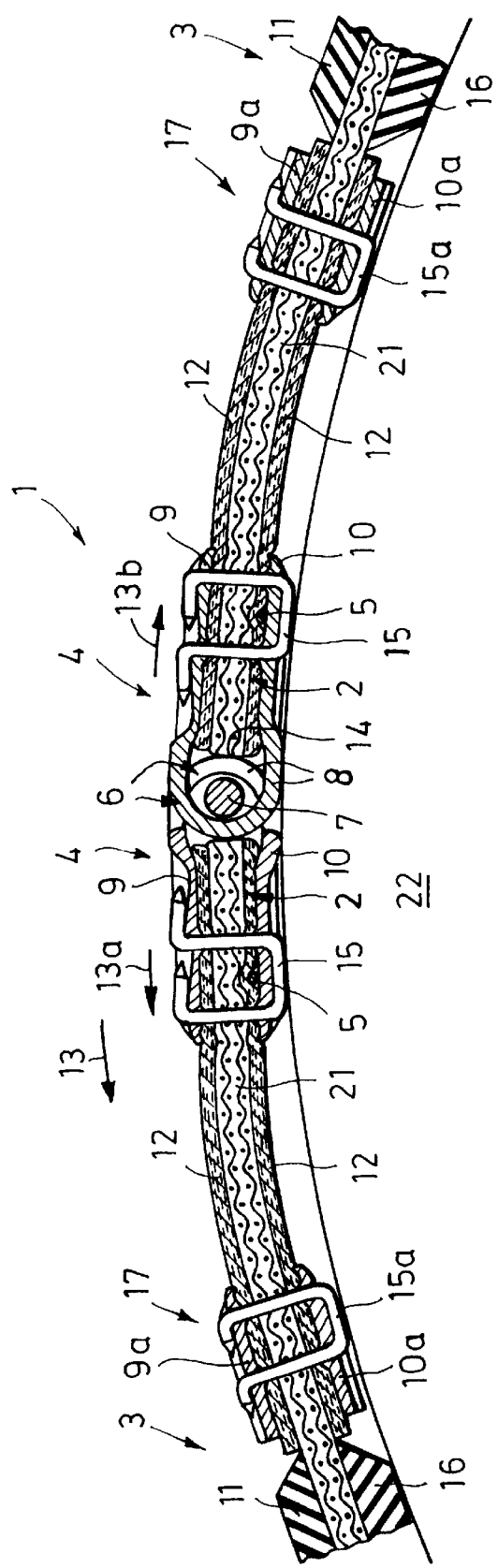
FIG. 3 is a view of a conveying device in the region of a deflection drum, which illustrates two conveyor belt ends which are fashioned according to the embodiment shown FIG. 2, with a rod connecting them.
Figure 4:
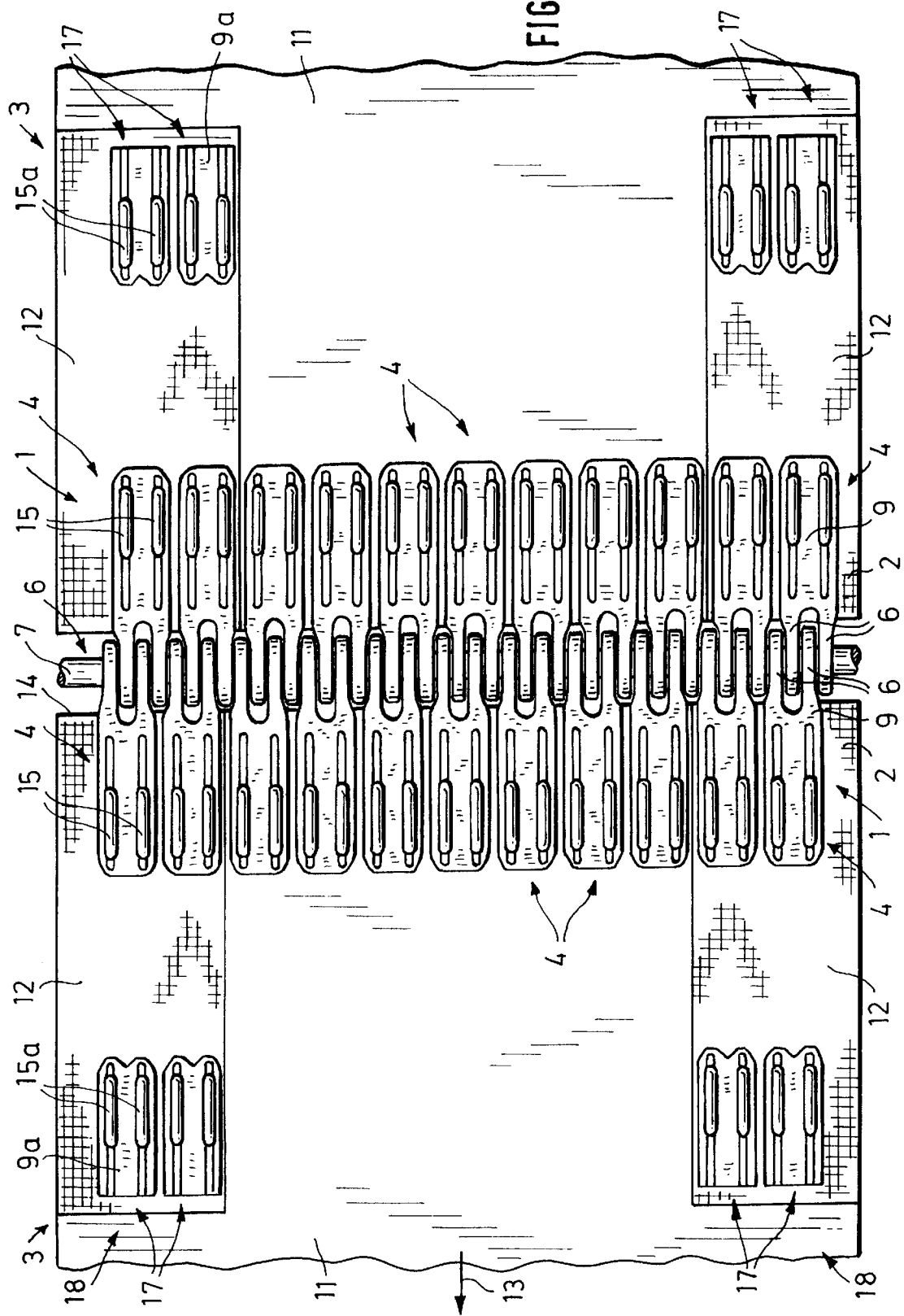
FIG. 4 is a plan view of the embodiment shown in FIG. 3.

FIG. 3 illustrates the conveyor belt in the region of a deflection drum 22. The direction of tension of the connecting elements 3 which are attached to the leading belt end 2 in the direction of conveying 13 is denoted by reference numeral 13a, and the direction of tension of the connecting elements 4 which are attached to the trailing belt end 2 in the direction of conveying 13 is denoted by reference numeral 13b. The directions of tension 13a and 13b extend perpendicularly to the coupling rod 7.

Figure 5:
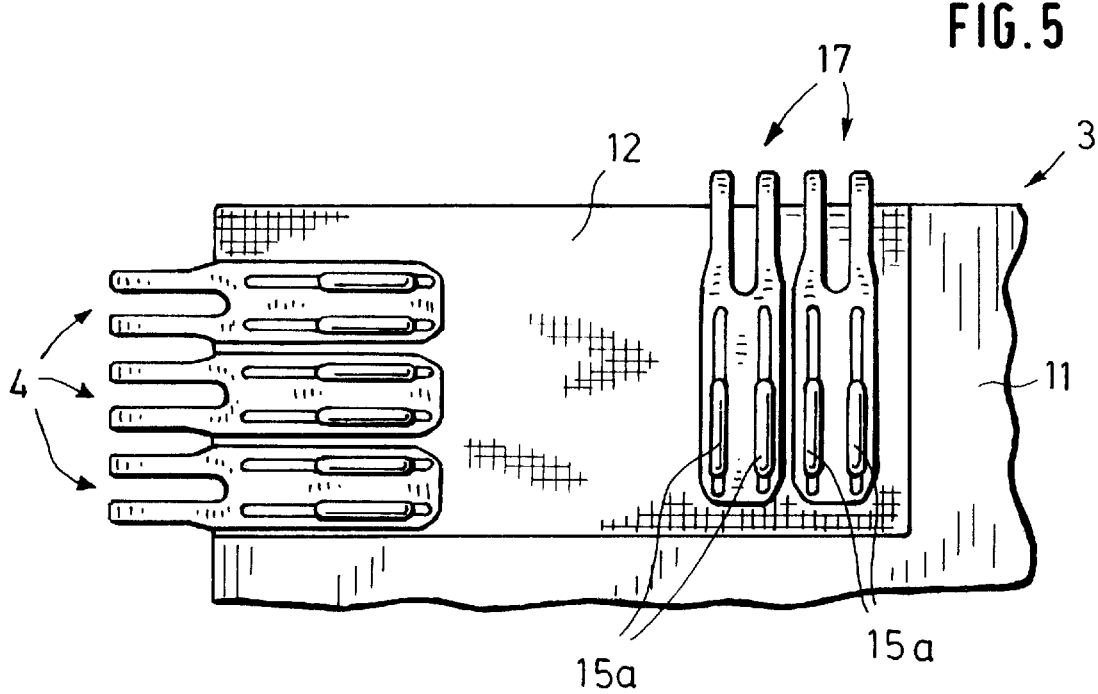
FIGS. 5 to 8 are plan views of a corner region of the conveyor belt end, showing different fastenings for the strap.
Figure 6:
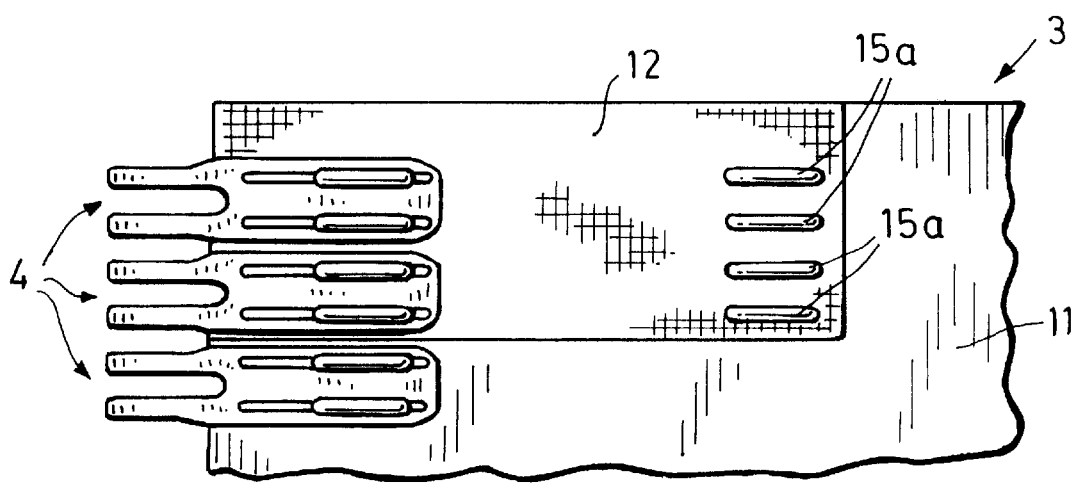
Figure 7:
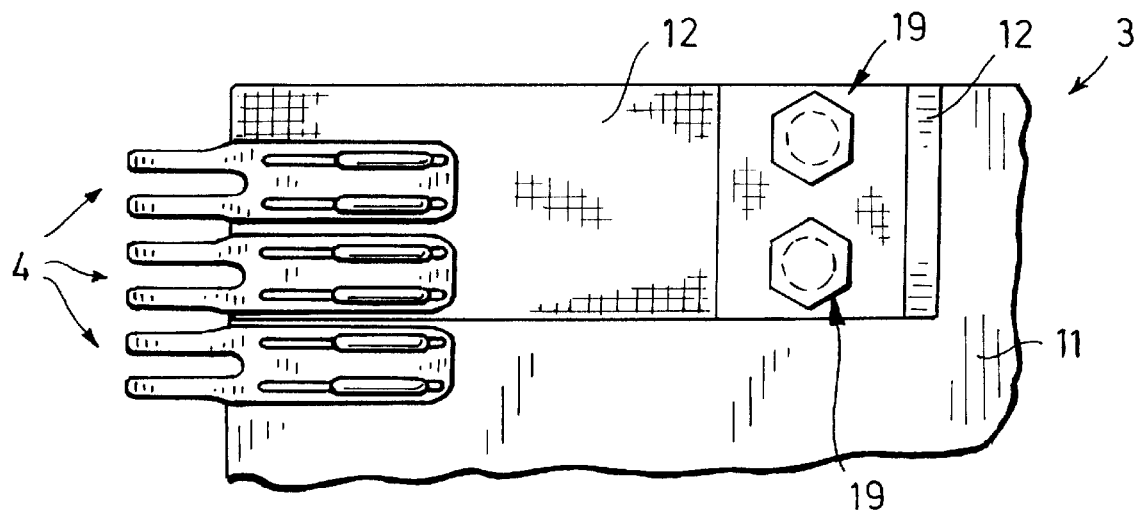
Figure 8:
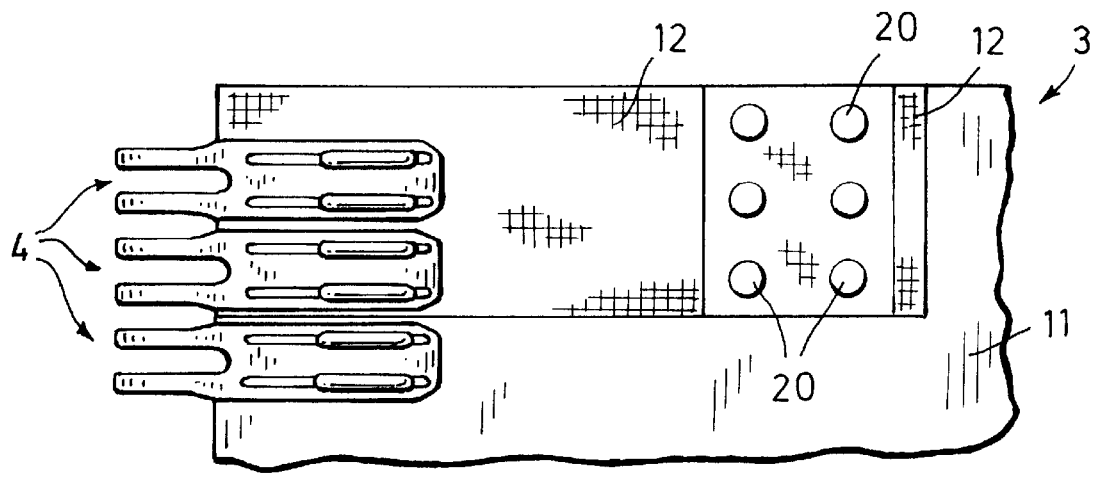

The embodiment which is shown in FIG. 5 illustrates a modified fastening of the strap 12 in the region of the connecting elements 17. Connecting elements 17 are used here which are of identical construction to the connecting elements 4, and which thus comprise loops 6. The connecting elements 17 here are pushed from the side onto the conveyor belt 3 and onto the strap 12 placed on the top face and/or bottom face of the conveyor belt 3 and are fastened by means of the staples 15a. The loop 6 of the respective connecting element 17 is thus seated against the conveyor belt 3 or is positioned at a short distance therefrom, and the limbs 9 and 10 extend over almost the entire width of the strap 12. In the embodiment shown in FIG. 6, fastening of the strap 12 in the region remote from the connecting elements 4 is effected solely by means of staples 15a. This Figure shows four staples which are disposed substantially over the width of the strap 12. Instead of a fastening arrangement comprising staples, FIG. 7 shows the fastening of the strap 12 by means of screws 19, and FIG. 8 shows a fastening arrangement by means of rivets 20. In the embodiments described above, the strap 12 can be attached to the fabric 21 by adhesive bonding or vulcanizing, in addition to the fastening which is effected by means of the fastening elements.

What is claimed is:

1. A belting system for conveyors and the like, comprising:
   a conveyor belt having a running face, a supporting face, and opposite ends to be interconnected;
   a plurality of connecting elements mounted on the opposite ends of said conveyor belt, and having free ends thereof interconnected with one another to define a belt connector;
   a plurality of connector fastening elements received through said connecting elements and through said conveyor belt to mount said connecting elements on said conveyor belt ends;
   at least one corner recess formed in one of said running and supporting faces of said conveyor belt adjacent an associated one of said opposite belt ends;
   at least one reinforcing strap having first and second ends, and being closely received in said corner recess; said reinforcing strap extending longitudinally along said conveyor belt, and having said first end thereof attached to said conveyor belt by at least one of said connector fastening elements; and
   a strap fastener connecting said second end of said reinforcing strap to said conveyor belt, whereby said reinforcing strap relieves stress at opposite sides of said belt connector to provide greater strength and durability.

2. A belting system as set forth in claim 1, wherein:
said conveyor belt includes at least one cover sheet having a predetermined thickness; and
said reinforcing strap has a thickness equal to or less than said predetermined thickness of said cover sheet.

3. A belting system as set forth in claim 2, wherein:
said cover sheet is removed from said conveyor belt to define said corner recess with a depth which positions said strap fastener substantially flush with the remaining portion of said cover sheet.

4. A belting system as set forth in claim 3, wherein:
said reinforcing strap is constructed from a textile fabric.

5. A belting system as set forth in claim 4, wherein:
said conveyor belt includes a textile fabric layer.

6. A belting system as set forth in claim 5, wherein:
said textile fabric layer of said conveyor belt includes two of said cover sheets disposed on opposite faces thereof, and
said cover sheets are constructed of PVC or rubber.

7. A belting system as set forth in claim 6, wherein:
said reinforcing strap has an elasticity similar to the elasticity of said textile fabric layer of said conveyor belt.

8. A belting system as set forth in claim 7, including:
one of said reinforcing straps attached to both said supporting face and said running face of said conveyor belt.

9. A belting system as set forth in claim 8, wherein:
each of said reinforcing straps is in the form of a narrow, rectangular strip disposed longitudinally along said conveyor belt, and having a length three to five times as great as its width.

10. A belting system as set forth in claim 9, wherein:
said strap fastener comprises at least one staple.

11. A belting system as set forth in claim 10, wherein:
said strap fastener includes at least one washer plate for said staple.

12. A belting system as set forth in claim 9, wherein:
said strap fastener comprises at least one screw.

13. A belting system as set forth in claim 12, wherein:
said strap fastener comprises at least one rivet.

14. A belting system as set forth in claim 13, wherein:
said strap fastener includes adhesive bonding.

15. A belting system as set forth in claim 14, wherein:
said strap fastener includes vulcanicity.

16. A belting system as set forth in claim 1, wherein:
said reinforcing strap is constructed from a textile fabric.

17. A belting system as set forth in claim 16, wherein:
said conveyor belt includes a textile fabric layer with two PVC or rubber cover sheets disposed on opposite faces thereof; and said reinforcing strap has an elasticity similar to the elasticity of said textile fabric layer of said conveyor belt.

18. A belting system as set forth in claim 1, including:
one of said reinforcing straps attached to both said supporting face and said running face of said conveyor belt.

19. A belting system as set forth in claim 1, wherein:
said reinforcing strap is in the form of a narrow, rectangular strip disposed longitudinally along said conveyor belt, and having a length three to five tines as great as its width.

20. A connector for conveyor belts and the like of the type having a running face, a supporting face, and opposite ends to be interconnected, comprising:

a plurality of connecting elements shaped for mounting on the opposite ends of the conveyor belt, and having free ends thereof shaped for interconnection with one another to define a belt connector;

a plurality of connector fastening elements received through said connecting elements and through the conveyor belt to mount said connecting elements on the conveyor belt ends;

at least one reinforcing strap having first and second ends, and being shaped for close reception in a corner recess formed in one of the running and supporting faces of the conveyor belt; said reinforcing strap extending longitudinally along the conveyor belt, and having said first end thereof attached to the conveyor belt by at least one of said connector fastening elements; and a strap fastener connecting said second end of said reinforcing strap to the conveyor belt, whereby said reinforcing strap relieves stress at opposite sides of said belt connector to provide greater strength and durability.

21. A belting system as set forth in claim 20, wherein: said reinforcing strap is constructed from a textile fabric.

22. A belting system as set forth in claim 21, including: one of said reinforcing straps attached to both said supporting face and said running face of said conveyor belt.

23. A belting system as set forth in claim 22, wherein: each of said reinforcing straps is in the form of a narrow, rectangular strip disposed longitudinally along said conveyor belt, and having a length three to five times as great as its width.

24. A belting system as set forth in claim 23, wherein: said strap fastener comprises at least one staple.

25. A belting system as set forth in claim 24, wherein: said strap fastener includes at least one washer plate for said staple.

26. A belting system as set forth in claim 23, wherein: said strap fastener comprises at least one screw.

27. A belting system as set forth in claim 23, wherein: said strap fastener comprises at least one rivet.

28. A belting system as set forth in claim 23, wherein: said strap fastener includes adhesive bonding.

29. A belting system as set forth in claim 23, wherein: said strap fastener includes vulcanicity.

30. A method for connecting the ends of conveyor belts and the like, comprising:

providing a plurality of connecting elements shaped for mounting on the opposite ends of the conveyor belt, and having free ends thereof shaped for interconnection with one another;

inserting connector fastening elements through the connecting elements and through the conveyor belt to mount the connecting elements on the conveyor belt ends to define a belt connector;

forming at least one corner recess in one of the faces of the conveyor belt adjacent an associated one of the opposite belt ends;

providing at least one reinforcing strap having first and second ends, and being shaped for close reception in the corner recess;

positioning the reinforcing strap in the corner recess; and attaching the reinforcing strap to the conveyor belt, including securing the first end of the reinforcing strap with at least one of the connector fastening elements, and securing the second end of the reinforcing strap to the conveyor belt with a strap fastener, whereby the reinforcing strap relieves stress at the opposite sides of the belt connector to provide greater strength and durability.

31. A method as set forth in claim 30, wherein:

the conveyor belt is provided with at least one cover sheet having a predetermined thickness; and selecting the reinforcing strap with a thickness equal to or less than the predetermined thickness of the cover sheet.

32. A method as set forth in claim 31, wherein:

said corner recess forming step comprises removing the cover sheet to a depth which positions the strap fastener substantially flush with the remaining portion of the cover sheet.

33. A method as set forth in claim 32, including:

constructing the reinforcing strap from a textile fabric.

34. A method as set forth in claim 33, including:

constructing the conveyor belt with a textile fabric layer.

35. A method as set forth in claim 34, wherein:

the textile fabric layer of the conveyor belt includes two PVC or rubber cover sheets disposed on opposite faces thereof; and including selecting the reinforcing strap with an elasticity similar to the elasticity of the textile fabric layer of the conveyor belt.

36. A method as set forth in claim 35, including:

attaching one of the reinforcing straps to both the supporting face and the running face of said conveyor belt adjacent each corner of both belt ends.

37. A method as set forth in claim 36, including:

shaping each of the reinforcing straps in the form of a narrow, rectangular strip disposed longitudinally along the conveyor belt, and having a length three to five times as great as its width.

* * * * *